C. F. HARVEY.
Rein-Holder.
No. 221,060. Patented Oct. 28, 1879.
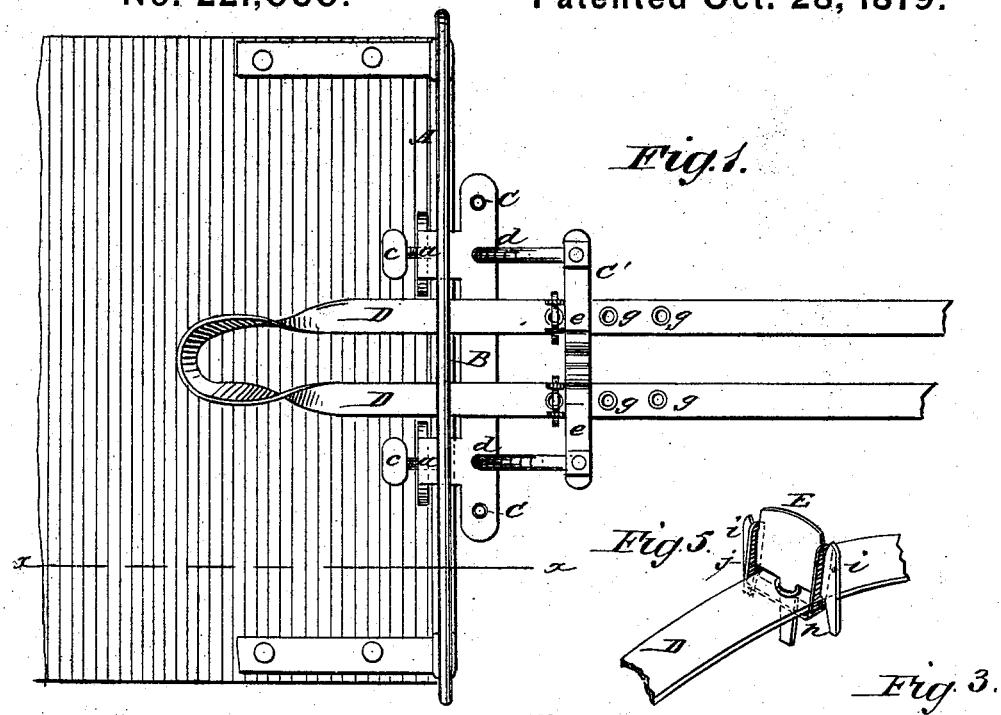
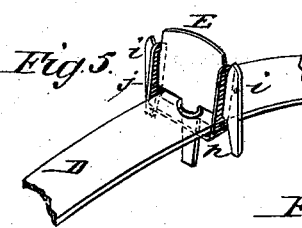
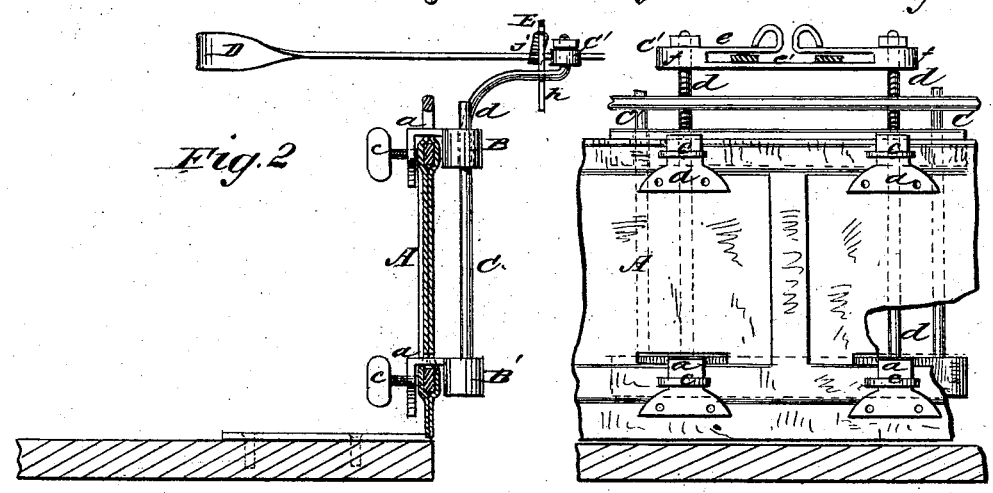
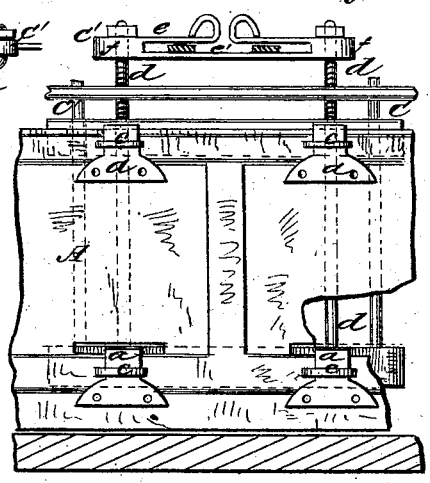
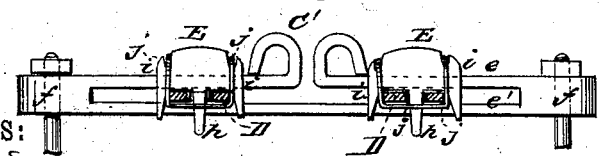
WITNESSES:
Francis McArdle
C. Sedgwick
INVENTOR:
C. F. Harvey
BY Munn & Co
ATTORNEYS.

UNITED STATES PATENT OFFICE.

CHARLES F. HARVEY, OF VAN BUREN, ARKANSAS.

IMPROVEMENT IN REIN-HOLDERS.

Specification forming part of Letters Patent No. 221,060, dated October 28, 1879; application filed July 1, 1879.

*To all whom it may concern:*

Be it known that I, CHARLES F. HARVEY, of Van Buren, in the county of Crawford and State of Arkansas, have invented a new and Improved Rein-Support, of which the following is a specification.

This invention relates to an improved attachment for the dash-board of wagons and other vehicles drawn by horses. The object thereof is to hold the reins up and prevent the animal from switching them down under his tail.

It consists of an adjustable frame attached to the dash-board, supporting a horizontal bar, composed of two parts, the upper divided so that the reins can be slipped down between the two parts.

Secondly, it consists of stops placed on the reins, which bear against the horizontal bar and prevent the reins from being drawn or switched down.

In the accompanying drawings, Figure 1 is a plan of the improvement applied to a dash-board. Fig. 2 is a cross-section of the same on line $x\ x$. Fig. 3 is a rear view of the dash-board, showing the manner of attaching the supporting-frame thereto. Fig. 4 is a rear view of the horizontal bar and stops, and Fig. 5 is a perspective view of the stop and one rein.

Similar letters of reference indicate corresponding parts.

Referring to the drawings, A is the dash-board. To the front of this dash-board is fixed a frame composed of bars B B', connected together by upright rods C C fixed in the lower bar, B', but connected with the upper bar in such a way as to permit it to be raised and lowered to accommodate the frame to dash-boards of different heights. To these bars are fixed hooks $a$, those on the upper bar, B, being hooked over the upper bar of the dash-board frame, while those on the lower, B', are passed through the dash-board and hooked over its lower bar, and they are retained in place by thumb-screws $c$ passed through the hooks and bearing against the dash-board, as clearly shown.

In the bars B B' are placed two upright rods, $d\ d$, the upper portions whereof above B being bent outward, and the extreme ends turned up.

C' represents the supporting-bar, composed of two parts, $e\ e'$, with a space between, branching from solid ends $f\ f$, having holes through them, through which the upturned ends of rods $d\ d$ are passed, nuts being screwed on the projecting ends to hold the bar C' in place. The upper part, $e$, of the bar is divided in the middle, to allow the reins to be slipped through. D D are the reins passed through the opening, so as to rest between the two parts of bar C'. These reins are provided with eyelets $g$ to receive the stop E, composed of a flat piece of metal with a central stud, $h$, and wings $i\ i$. To secure the stop to the rein the stud is passed through an eyelet back of bar C', with the wings $i$ projecting over the edges of the reins. A rubber strap, $j$, is then passed under the reins, and its slotted ends passed up over the wings until they rest in the notches between the wings and the body of the stop, as clearly shown in the drawings, thus securing the stops to the reins, so that they cannot slip from their position.

The stops E are set back sufficiently far to allow a slight slack in the reins between the bar C' and the horse; but they prevent the reins, by bearing against bar C', from falling under the horse's heels, and make it impossible for the horse to switch the reins under his tail or out of the driver's grasp. They also render a check-rein unnecessary, and when the horse is watered it is only necessary to slip the reins out of the supporting-bar C', when he is at full liberty to lower his head sufficiently to reach the water, and thus the necessity of the driver getting out of the wagon to release the check-rein, as has to be done now, is avoided.

Hooks $a$ are provided with screw-holes, to enable them to be fastened to the dash-board, with screws in case there are no bars to support them.

Having thus described my invention, I claim as new and desire to secure by Letters Patent—

1. As an improvement in rein-holders, the horizontal supporting-bar C', composed of two parts, $e\ e'$, the former divided in the middle, said bar being supported on a suitable frame attached to the dash-board, in combination with the stops E, placed on the reins back of the bar C', to prevent them from being drawn out, substantially as described.

2. The frame composed of bars B B', connected together by rods C, and provided with hooks $a$ and set-screws $c$, to connect it with the dash-board, in combination with the rods $d$, placed in bars B B', horizontal supporting-bar C', supported by rods $d$, and composed of two parts, $e\ e'$, and stops E, fixed in reins D, for the purpose of furnishing a support for the reins, substantially as described.

CHARLES FREDRICK HARVEY.

Witnesses:
   D. W. MOORE,
   W. H. H. SHIBLEY.